United States Patent [19]

Huppunen et al.

[11] 4,332,373
[45] Jun. 1, 1982

[54] SOLDER POT WITH REPLENISHER AND SKIMMER

[75] Inventors: Robert D. Huppunen, Cos Cob; Theodore J. Morin, New Canaan, both of Conn.

[73] Assignee: Thermatool Corp., Stamford, Conn.

[21] Appl. No.: 149,767

[22] Filed: May 14, 1980

[51] Int. Cl.³ .............................................. C21B 3/04
[52] U.S. Cl. ......................................... 266/228; 75/61
[58] Field of Search ............................. 266/228; 75/61

[56] References Cited

U.S. PATENT DOCUMENTS

| | | | |
|---|---|---|---|
| 2,610,218 | 9/1952 | Lang | 266/900 |
| 3,790,145 | 2/1974 | Gering | 266/900 |
| 3,893,657 | 7/1975 | Sieurin | 266/228 |

Primary Examiner—P. D. Rosenberg

Attorney, Agent, or Firm—Brooks, Haidt, Haffner & Delahunty

[57] ABSTRACT

Solder pot apparatus comprising a tank divided into first and second sections by a common wall with holes therein below the level of molten solder in the sections for the transfer of molten metal between the sections. The wall has relatively low heat conductivity. The sections are heated by separately controlled heating elements, the heating elements for the second section having a heating capacity higher than that of the first section, so that solder ingots may be rapidly melted in the second section without substantially affecting the solder temperature in the first section. A ramp extends from the first section to the second section and a powered skimmer stirs metal, and removes dross from metal, in the first section and pushes the dross over the ramp into the second section. Also, the apparatus includes a metal surface level sensor in the second section and signals and an ingot feeder controlled by the sensor.

21 Claims, 7 Drawing Figures

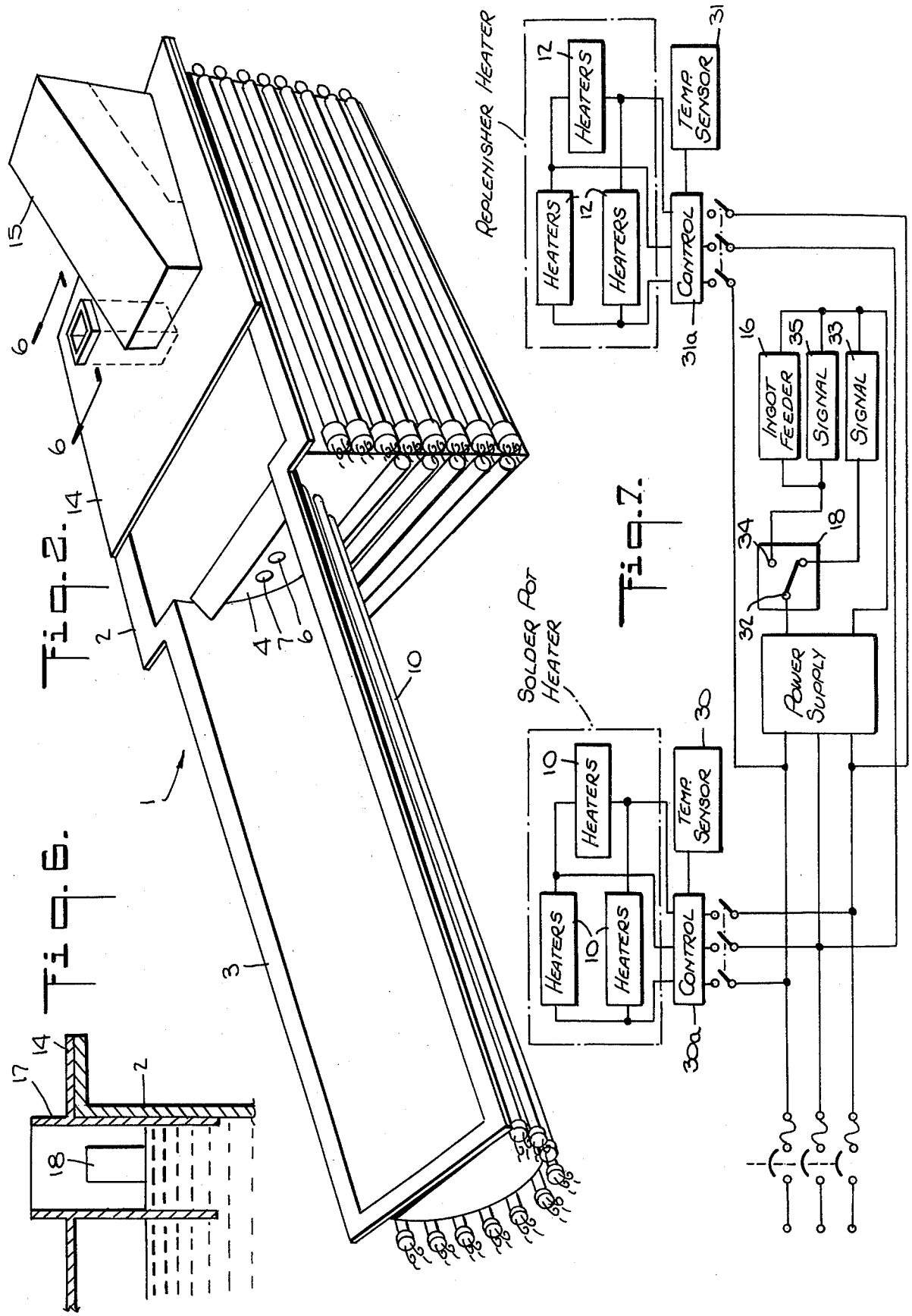

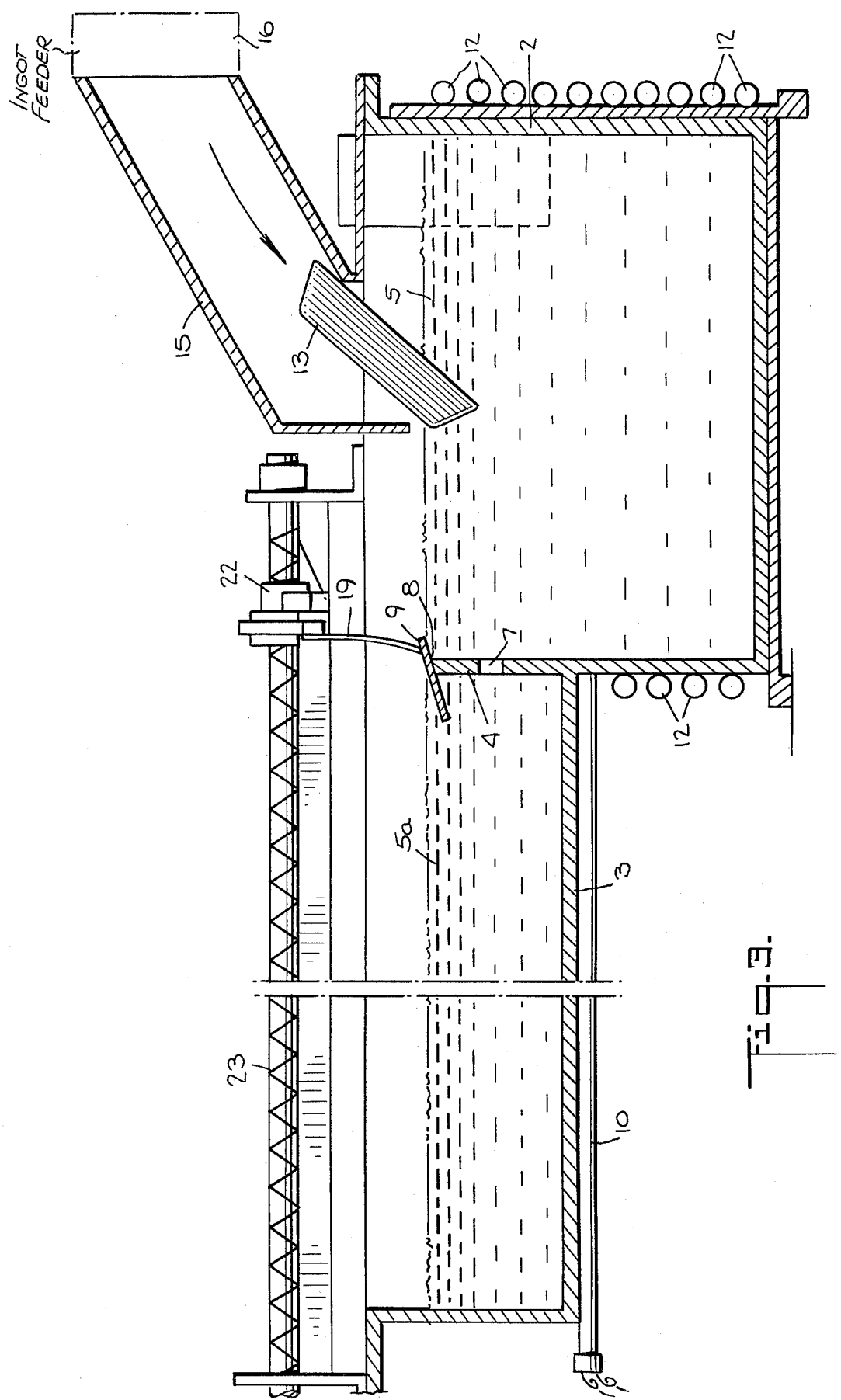

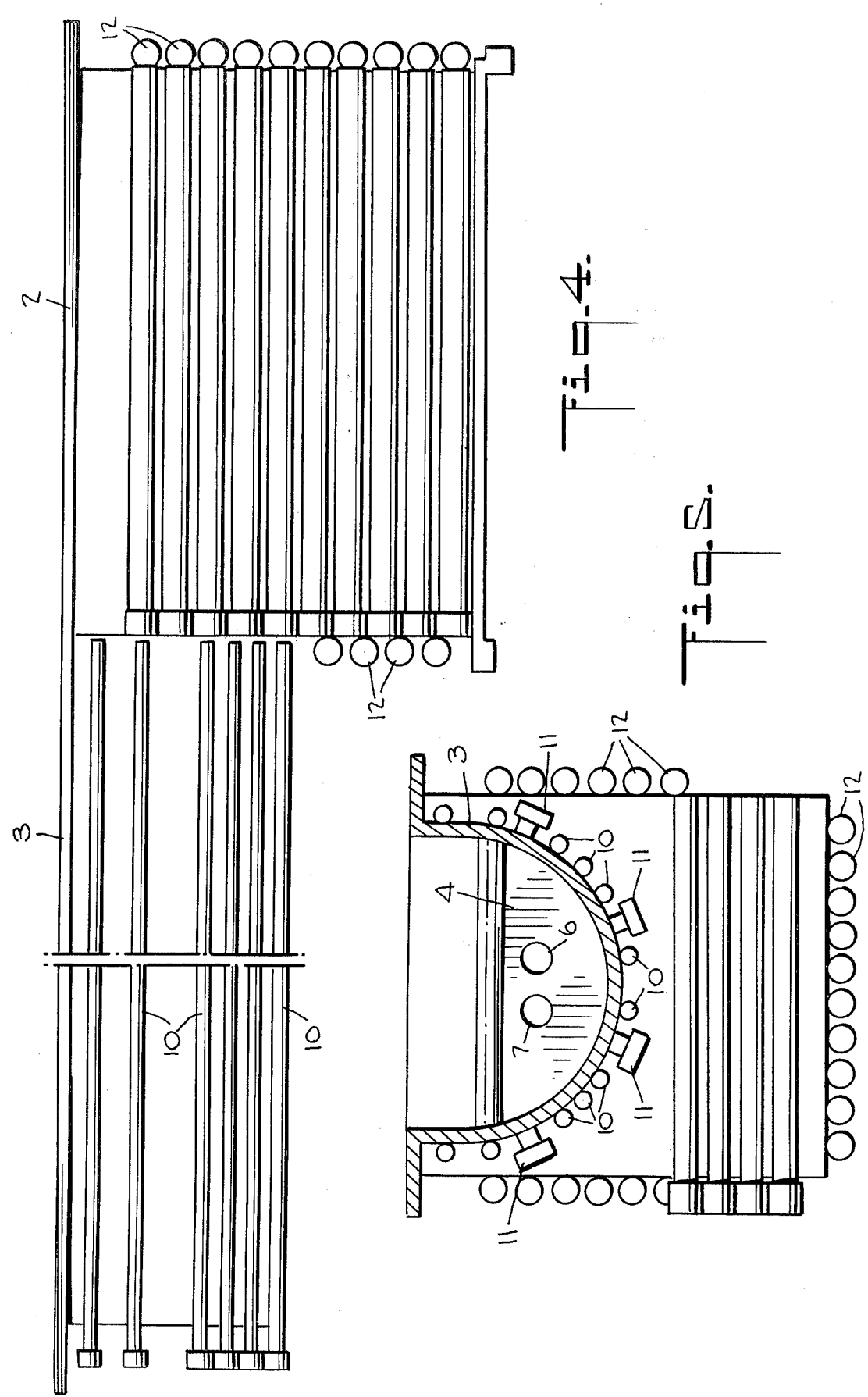

SOLDER POT WITH REPLENISHER AND SKIMMER

This invention relates to a pot for molten metal having an associated metal replenisher and a skimmer for removing dross from the surface of the molten metal in the pot.

Solder pots containing molten solder are known in the art, and usually, parts to be soldered are dipped into the molten solder. An example of the use of a solder pot to solder return bends to radiator tubes is disclosed in the co-pending application of Robert D. Huppunen and Robert R. Harriau entitled "Soldering Method and Apparatus," filed Feb. 26, 1979, Ser. No. 14,858 and assigned to the assignee of this application.

Each time that a part is dipped into the solder and then removed, a certain amount of the solder is removed which makes it necessary to add solder to the pot if a desired solder surface level is to be maintained. For example, with the apparatus described in said application, each return bend removes about two-thirds of an ounce of solder from the solder bath.

The molten solder in the pot should be kept at a temperature within a relatively narrow range for satisfactory results, the temperature range being dependent on the composition of the solder. For example, if the solder is zinc-aluminium (95/5) eutectic solder, the temperature should be kept within the range from about 785° F. to about 795° F.

If the lost solder is replaced by putting solid solder ingots into the molten solder in the pot, there are several disadvantages as follows:

(1) Danger to the operator when putting the ingot in the hot, molten solder bath;
(2) Loss of manufacturing time while waiting for the ingot to melt and for the temperature of the molten solder bath to stabilize;
(3) Substantial dross is introduced into the solder bath;
(4) The precision with which the surface level of the solder bath is maintained depends upon the skill and attentiveness of the operator; and
(5) Degasing of the solder by applying ultrasonic energy must be initiated before the soldering can be continued.

It has been proposed to overcome the disadvantages of manual resupply of solder to the pot by pumping premelted solder from another pot, or replenisher, with the pumping being controlled automatically by means of a level detector in the solder pot. Such a system has the following disadvantages:

(1) Substantial additional capital investment is required;
(2) There is a tendency for the level control apparatus to fail due to clogging;
(3) There are problems inherent in pumping molten metal due to the temperatures, clogging, etc.; and
(4) The size of the additional replenisher pot and associated apparatus requires space almost equivalent to the solder pot itself.

Numerous patents disclose the efforts of others to overcome the problems of replacing lost solder in a solder pot. See, for example, U.S. Pat. Nos. 1,725,960; 1,947,689; 2,579,634; 3,570,741; and 3,865,297. However, none of such systems has the simplicity and all the advantages of the apparatus of the present invention.

One object of the invention is to provide a solder pot-replenisher combination which overcomes most of the previously described disadvantages of prior art systems set forth hereinbefore.

The presently preferred embodiment of the apparatus of the invention comprises a tank having a first section forming a solder pot and a second section forming a solder replenisher. The sections have a common wall having at least one opening therein below the level of the surface of the solder in the solder pot which permits molten solder to flow between the replenisher and the solder pot. Both sections are electrically heated, but the heaters therefore are separate and independent of each other. The heating capacity of the replenisher heater is higher than that of the solder pot heater so that ingots may be rapidly heated therein, and the common wall has a heat conductivity which minimizes the effects of large variations in the temperature of the solder in the replenisher and the temperature of the solder pot. A ramp interconnects the solder pot and the replenisher at the common wall, the lower edge of the ramp being below the surface level of the solder in the solder pot and the higher edge of the ramp being located above the solder level in the replenisher. A skimmer of the type described in said application pushes dross from the surface of the solder in the solder pot up the ramp and into the replenisher. The surface level of the molten solder in the replenisher is at the same height as the surface level of the molten solder in the solder pot by reason of the opening or openings in the common wall, and a solder level detector in a partitioned section of the replenisher detects the solder surface level and may operate a signal and/or, if desired, automatic means for feeding solder ingots to the replenisher.

Other objects and advantages of the present invention will be apparent from the following detailed description of the presently preferred embodiments thereof, which description should be considered in conjunction with the accompanying drawings in which:

FIG. 2 is an isometric view of a portion of the pot of the invention, on a smaller scale, with the skimming apparatus omitted;

FIG. 3 is a longitudinal, cross-sectional view of the apparatus shown in FIG. 2 but with the skimming apparatus;

FIG. 4 is a side elevation view of the apparatus shown in FIG. 2;

FIG. 5 is a transverse, cross-sectional view of the apparatus shown in FIG. 2;

FIG. 6 is a fragmentary, cross-sectional view of a portion of the apparatus shown in FIGS. 2 and 3; and FIG. 7 is an electrical diagram illustrating heater and level controls which may be used with the apparatus of the invention.

Figure 1:
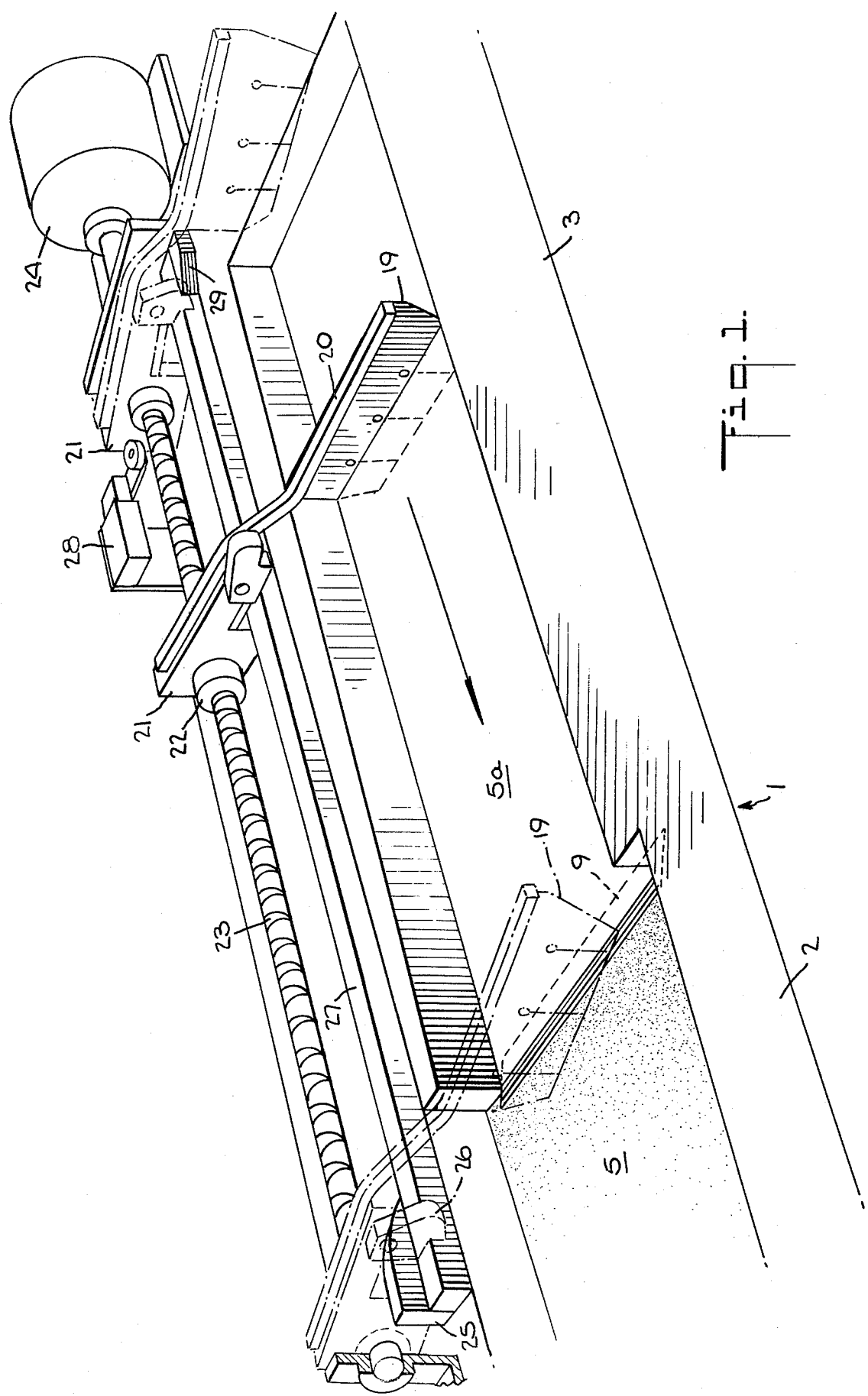
FIG. 1 is an isometric view of a portion of the pot of the invention with dross skimming apparatus associated therewith.

In the preferred embodiment of the invention, the apparatus comprises a single tank 1 which is divided into two sections, a replenisher section 2 and a work or solder pot section 3, separated from each other by a common wall or partition 4, preferably made of a lower heat conductivity material, such as stainless steel, german silver, or carbon, to reduce the transfer of heat from the replenisher section 2 to the work section 3 by way of the wall 4. The heat conductivity of the material of the wall 4 should be lower than the heat conductivity of the metal being melted in the section 2. However, if desired, two separate tanks, one of each section, could be used provided that means are provided for transferring molten metal 5 from the replenisher section 2 to the work section 3 and for transferring dross from the work section 3 to the replenisher section 2. Both sections of the tank 1 may be surrounded by heat insulating material (not shown) to reduce the loss of heat from the tank 1.

The wall 4 has at least one hole therethrough of a size which permits the molten metal 5, such as molten solder, to flow therethrough from the section 2 to the section 3 but of a size which minimizes the flow of heat from the section 2 to the section 3 by way of the interface between the molten metal 5 in the replenisher section 2 and the molten metal 5a in the work section 3. Thus, the wall 4 may have two holes 6 and 7 therein each of about one inch diameter and one spaced from the other at about two inches between centers. The area of the cross-sections of the holes should be small relative to the area of the wall 4 which may, for example, have a height of about $4\frac{1}{4}$ inches and a width, at its top 8 (see FIG. 3), of about $9\frac{3}{4}$ inches. Both holes 6 and 7 are located below the top 8 of the wall 4 so that dross on top of the molten metal 5 in the section 2 cannot flow through the holes 6 and 7 into the section 3 and so that the levels of the molten metal 5 and 5a may be below the top 8 but above the upper edges of the holes 6 and 7.

A metal ramp 9, for purposes hereinafter described, is mounted in a fixed position at the top 8 of the wall 4, and extends part way into both of the sections 2 and 3 and the upper surface of the ramp 9 slopes upwardly in the direction from section 3 to section 2 to above solder level in section 2.

The section 3 is provided with a plurality of electrical heating elements 10 and may be provided with a plurality of ultrasonic transducers 11 of a known type and employed to improve soldering. The section 2 is also provided with a plurality of electrical heating elements 12 having a higher heating capacity than the plurality of elements 11, the latter elements being required merely to maintain the temperature of the molten metal 5a within a predetermined temperature range, such as 785° to 795° F., whereas the elements 12 not only normally maintain the molten metal 5 in the replenisher section 2 at such temperature but also rapidly melt any solid metal ingots 13 supplied to the section 2.

The section 2 is provided with a cover 14 supporting a chute 15 by means of which solid metal ingots 13 may be supplied to the section 2 either manually or by means of a powered ingot feeder 16 of any conventional type.

The cover 14 also supports a tubular member 17, the lower end of which extends at least to the upper surface of the molten metal 5 when the apparatus is in operation. A level detector 18 (see FIG. 6) is mounted in the member 17 so as to indicate the surface level of the metal 5. Preferably, the level detector 18 is of the type known as a "LIMICON" and which is sold by Limicon Corporation, P.O. Box 262, Three Bridges, N.J. In such detector a flow of air is directed toward the open end of a signal tube, and as long as the end of the tube is not blocked, a snap-action electrical switch is unactuated. When the open end of the signal tube is blocked, the switch is activated. Thus, the detector 18 will indicate by the condition of the switch whether the level of the metal 5 is at or below the end of the signal tube, and the switch can be used as described hereinafter to monitor the level of the molten metal 5 and, if desired, to activate the ingot feeder 16.

The section 3 and the dross skimming apparatus associated therewith is substantially the same as the solder pot and skimming apparatus described in said application Ser. No. 14,858, filed Feb. 26, 1979. The skimming apparatus comprises a skimmer or paddle 19 which is illustrated by solid lines in FIG. 1 in its position when it is immersed in the molten metal 5a. The skimmer 19 is illustrated by dash-dot lines at the right end of FIG. 1, and in this position, it is at rest or inactive. At the left end of FIG. 1, the dash-dot illustration of the skimmer 19 shows its position when it is removed from the metal 5a after moving dross from the top of the metal 5a and to the left end of the section 3 and over the ramp 9 into the section 2 and after stirring the metal 5a.

The skimmer or paddle 19 extends from an arm 20 secured to a block 21 which has a threaded collar 22 secured thereto. A known type of self-reversing screw shaft 23 extends through the collar 22 and is rotatable by a motor and gear drive 24 which may, for example, rotate the shaft 23 at about 160 r.p.m. The shaft 23 always rotates in the same direction, and it moves the block 21, and hence, the skimmer 19, from this position shown in full lines to the position shown in dash-dot lines at the left end of FIG. 1. Just prior to reaching the latter position, the block 21 engages a fixed cam 25 which raises the skimmer 19, and such raising of the skimmer 19 permits a pivotable catch or detent 26 to lower and engage its lower end with a rail 27. The direction of movement of the block 21 is then reversed by the shaft 23, but the skimmer 19 remains in its raised position by reason of engagement of the catch 26 with the rail 27. The shaft 23 than moves the block 21 to the position shown in dash-dot lines at the right end of FIG. 1 where the block 21 engages the operating element of a switch 28 which stops the drive 24.

The skimmer 19 then remains in a fixed, raised position until the drive 24 is again operated at which time rotation of the shaft 23 causes the block 21 to move farther to the right, as viewed in FIG. 1, which causes the catch 26 to engage a cam 29 which disengages the lower end of the catch 26 from the rail 27 and permits the skimmer 19 to lower and become immersed in the molten metal 5a. The movement of the block 21 is then reversed by the shaft 23 so that it moves to the left, as viewed in FIG. 1, and so that the skimmer 19 pushes dross on top of the molten metal 5a to the left end of the section 3, and at the same time, stirs the metal 5a to eliminate composition variations due to density and thermal differences. During the latter movement, the side of the catch 26 rides on the rail 27. The catch 26 may pivot into its rail-engaging position merely by reason of gravity or may be spring biassed into the vertical position shown in dash-dot lines.

In summary, each time that operation of the drive 24 is initiated, the skimmer 19 lowers into the molten metal 5a, moves to the left end of the section 3 and rides over the ramp 9 pushing dross into the section 2. The skimmer 19 then raises and returns to a rest position at the right end of the section 3 in its withdrawn or raised position. The skimmer 19 is flexible enough to permit it to bend slightly as it rides over the ramp 9 and to permit it to contact the upper surface of the ramp 9 across its width and thereby push the dross up the ramp 9 and into the section 2.

Operation of the drive 24 in synchronism with the immersion of parts into the molten metal 5a is described in greater detail in said application Ser. No. 14,858. Generally speaking, the skimmer 19 traverses the metal 5a shortly before each group of parts to be soldered is immersed in the molten metal 5a.

FIG. 7 illustrates a circuit diagram of the electrical controls which may be used with the apparatus of the invention. The temperature of the molten metal 5a is measured by a conventional temperature sensor 30 which may, for example, be a thermocouple immersed in the metal, and energizes or de-energizes the heating elements 10 by way of a control 30a, such as a silicon controlled rectifier control, so as to maintain the temperature of the metal 5a within a desired range, e.g. 785° to 795° F. for eutectic solder. The temperature of the molten metal 5 is similarly maintained within the desired temperature range, e.g. 775° to 815° F. for eutectic solder, by a similar temperature sensor 31 in the molten metal 5 and connected to a similar control 31a. As mentioned, the heating elements 12 have a higher heating capacity than the elements 10, in a well known manner, so that when a solid ingot 13 is placed in the section 2, it will be melted rapidly without a large drop in the temperature of the metal 5. Effects of changes in the temperature of the metal 5 on the temperature of the metal 5a in the section 3 will be kept small because of the small size of the holes 6 and 7 and because of the relatively low conductivity of the wall 4.

The level detector or sensor 18 has a switch 32 which, in the position shown indicates that the end of the signal tube thereof is blocked and the level of the metal 5 is satisfactory. The switch 32 may, in this position, complete an obvious circuit for a signal 33, such as an indicator lamp, to indicate that the level of the metal 5 is satisfactory. When the level of the metal 5 lowers due to the removal of metal 5a from the section 3 by parts being soldered, the signal tube will become unblocked, and the switch 32 will operate to engage the contact 34. Such operation of the switch 32 closes an obvious circuit for a signal 35, which may be an indicator lamp, an audible alarm, or both. When the signal 35 operates, the equipment operator may deposit one or more ingots 13 in the chute 15 manually until the signal 35 is rendered inoperative and the signal 34 operates. Alternatively, if the equipment is provided with a powered ingot feeder 16, the switch 34 may complete an obvious circuit through the contact 34 for energizing the ingot feeder 16 until the switch 32 separates from the contact 34.

In the preferred method of operation, the heating elements 10 and 12 are energized and the sections 2 and 3 are supplied with metal, such as solder, either solid or molten. After all the metal 5 and 5a is molten and the surface level thereof is at the desired level and at least above the upper edges of the holes 6 and 7 but below the upper edge of the ramp 9, and preferably, at the top 8 of the wall 4, the temperature of the metal 5 and 5a is allowed to stabilize and the level sensor 18 is adjusted to indicate that the level of the metal 5 is satisfactory. Then, the skimmer 19 is cycled by energizing the drive 24, to stir the metal 5a and to move dross from the surface thereof into the section 2 by way of the ramp 9. The metal 5a is then ready to have parts to be soldered dipped therein. As the level of the metal 5a lowers because of the removal thereof by the parts, replacement metal 5 flows from the section 2 into the section 3 by way of the holes 6 and 7. When the level of the metal 5 lowers by an increment sufficient to operate the switch 32 of the sensor 18 into engagement with the contact 34, a solid ingot 13 or solid ingots 13 are added manually or by the feeder 16 to the section 2 by way of the chute 15 until the desired level of the metal 5 is re-attained. The skimmer 19 is cycled as required to stir the metal 5a and to remove dross from the surface thereof and may, for example, be cycled between the dipping of each batch of parts into the molten metal 5a.

Although preferred embodiments of the present invention have been described and illustrated, it will be apparent to those skilled in the art that various modifications may be made without departing from the principles of the invention.

What is claimed is:

1. Molten metal bath apparatus comprising:
   a tank comprising a first section for molten metal and a second section for molten metal separated from said first section by a wall common to the first section and the second section and extending to the bottom of each section, said wall having an upper end and having at least one opening therein, the area of the opening or openings being small compared to the area of said wall so as to restrict the flow of heat between said first section and said second section but having a size which permits the flow of molten metal therethrough from said second section to said first section, whereby the temperature of the metal in said first section may differ from the temperature of the metal in said second section, said opening or openings being spaced from and below said upper end and being above the bottom of each section to provide a portion of said wall below the opening or openings which prevents the flow of molten metal between said first section and said second section except at the opening or openings and above said wall, whereby said first section and said second section may be filled with molten metal to a level above the opening or openings and below said upper end;
   first heating means for heating metal in said first section to at least its melting temperature and including means for maintaining the temperature thereof substantially at a predetermined temperature; and
   second heating means for heating metal in said second section to at least its melting temperature, said second heating means being operable independently of the level of molten metal in said first section and separately from said first heating means to permit rapid melting of solid metal inserted in said second section without increasing the heating by said first heating means.

2. Molten metal bath apparatus as set forth in claim 1 wherein said wall has a lower heat conductivity than the metal to be received in said tank whereby the transfer of heat from metal in said second section to metal in said first section is less than it would be in the absence of said wall between metal in the two sections.

3. Molten metal bath apparatus as set forth in claim 2 wherein said wall is made from a material selected from the group consisting of stainless steel, german silver and carbon.

4. Molten metal bath apparatus as set forth in claim 1 or 2 wherein said second heating means has a heating capacity higher than said first heating means.

5. Molten metal bath apparatus as set forth in claim 1 or 2 further comprising a ramp at the top of said wall and extending from said first section to said second section, said ramp sloping upwardly in the direction from said first section to said second section, and skimming means mounted on said tank and having a skimmer immersible in metal in said first section and means for moving said skimmer along said first section in the direction of said ramp and at least to the top of said ramp for removing dross from the surface of molten metal in said first section and into said second section.

6. Molten metal bath apparatus as set forth in claim 1 or 2 further comprising metal surface level sensing means mounted in said second section for sensing the level of metal in said second section and means responsive to said sensing means.

7. Molten metal bath apparatus as set forth in claim 6 wherein said means responsive to said sensing means comprises metal level signal means.

8. Molten metal bath apparatus as set forth in claim 6 wherein said means responsive to said sensing means comprises means for feeding solid metal into said second section.

9. Molten metal bath apparatus comprising:
a first receptacle for molten metal;
a second receptacle for molten metal;
molten metal conducting means extending from said first receptacle below the top thereof to said second receptacle below the top of the latter so that molten metal below the surface thereof in said second receptacle may be transferred into said first receptacle below the surface of molten metal in said first receptacle;
heating means for heating metal in said receptacles to their melting temperatures; and
transfer means above said conducting means for transferring molten metal materials at the surface of molten metal in said first receptacle to said second receptacle.

10. Molten metal bath apparatus as set forth in claim 9 wherein said transfer means comprises a ramp at a level higher than said conducting means and extending from said first receptacle to said second receptacle.

11. Molten metal bath apparatus as set forth in claim 10 wherein said transfer means comprises a skimmer insertable in said first receptacle at a position spaced from said ramp and means for moving said skimmer from said position to said ramp whereby said skimmer traverses at least a portion of the surface of molten metal in said first receptacle and pushes materials on said last-mentioned surface onto said ramp.

12. Molten metal bath apparatus as set forth in claim 11 wherein said ramp has an upper surface which slopes upwardly in the direction from said first receptacle to said second receptacle and wherein said moving means moves said skimmer over said upper surface in the direction from said first receptacle to said second receptacle.

13. Molten metal bath apparatus as set forth in claim 9 wherein said first receptacle has a wall common with said second receptacle wherein said conducting means comprises said wall, said wall having at least one hole therethrough below the top thereof for the flow of molten metal between said second receptacle and said first receptacle.

14. Molten metal bath apparatus as set forth in claim 13 wherein said transfer means comprises a ramp at said wall and above the hole or holes in said wall, said ramp extending from said first receptacle to said second receptacle.

15. Molten metal bath apparatus as set forth in claim 14 wherein said transfer means comprises a skimmer insertable in said first receptacle at a position spaced from said ramp and means for moving said skimmer from said position to said ramp whereby said skimmer traverses at least a portion of the surface of molten metal in said first receptacle and pushes materials on said last-mentioned surface onto said ramp.

16. Molten metal bath apparatus as set forth in claim 15 wherein said ramp has an upper surface which slopes upwardly in the direction from said first receptacle to said second receptacle and wherein said moving means moves said skimmer over said upper surface in the direction from said first receptacle to said second receptacle.

17. Molten metal bath apparatus as set forth in claim 13 wherein said wall has a lower heat conductivity than the metal to be received in the first and second receptacles whereby the transfer of heat from metal in second receptacle to said first receptacle is less than it would be in the absence of said wall between metal in the two receptacles.

18. Molten metal bath apparatus as set forth in claim 9 or 17 wherein there are first heating means for said first receptacle and second separate heating means for said second receptacle and wherein said second heating means has a heating capacity higher than the heating capacity of said first heating means.

19. Molten metal bath apparatus as set forth in claim 9 further comprising metal surface level sensing means mounted in said second receptacle for sensing the level of metal in said second receptacle and means responsive to said sensing means.

20. Molten metal bath apparatus as set forth in claim 19 wherein said means responsive to said sensing means comprises metal level signal means.

21. Molten metal bath apparatus as set forth in claim 19 wherein said means responsive to said sensing means comprises means for feeding solid metal into said second section.

* * * * *